United States Patent [19]
Suzuki et al.

[11] Patent Number: 5,602,412
[45] Date of Patent: Feb. 11, 1997

[54] IMAGING DEVICE WHICH ADJUSTS THE RATIO OF COLOR EXCITATION VALUES PRODUCED BY AN IMAGE PICKUP ELEMENT IN ACCORDANCE WITH AN EXIT PUPIL POSITION AND THE SIZE OF AN APERTURE

[75] Inventors: Masahiro Suzuki, Kawasaki; Koichiro Kawamura, Ichiharashi, both of Japan

[73] Assignee: Nikon Corporation, Tokyo, Japan

[21] Appl. No.: 515,424

[22] Filed: Aug. 15, 1995

[30] Foreign Application Priority Data

Aug. 15, 1994 [JP] Japan .................................. 6-191640
Feb. 14, 1995 [JP] Japan .................................. 7-025463

[51] Int. Cl.$^6$ .................................................. H01L 31/00
[52] U.S. Cl. .................... 257/432; 257/440; 257/448; 348/223; 348/224; 348/277; 358/906; 358/909.1
[58] Field of Search ................... 257/440, 233, 257/294, 432, 448; 250/208.1; 358/335, 342, 906, 909.1; 348/224, 223, 277, 213, 228

[56] References Cited

U.S. PATENT DOCUMENTS

| | | | |
|---|---|---|---|
| 4,084,179 | 4/1978 | Sekiguchi | 358/55 |
| 4,843,456 | 6/1989 | Iida et al. | 348/360 X |
| 4,885,635 | 12/1989 | Kimura et al. | 358/98 |
| 5,198,890 | 3/1993 | Suga | 358/29 |
| 5,218,452 | 6/1993 | Kondo et al. | 358/342 |
| 5,479,206 | 12/1995 | Ueno et al. | 348/211 |

FOREIGN PATENT DOCUMENTS 63-80233   4/1988   Japan .

*Primary Examiner*—William Mintel
*Attorney, Agent, or Firm*—Staas & Halsey

[57] ABSTRACT

An imaging device which includes an optical unit passing light from a subject and having an exit pupil position. An image pickup element receives the light from the subject passing through the optical unit, and produces an image signal from the received light. The image signal has corresponding color excitation values. A color compensation mechanism adjusts a ratio of the color excitation values of the image signal produced by the image pickup element by adjusting at least one of the color excitation values in correspondence with the exit pupil position of the optical unit. Further, the imaging device can include an aperture positioned between the optical unit and the image pickup element to limit the amount of light received by the image pickup element from the optical unit. The size of the aperture is adjustable. The color compensation mechanism can then adjust a ratio of the color excitation values of the image signal produced by the image pickup element by adjusting at least one of the color excitation values in correspondence with the size of the aperture.

16 Claims, 12 Drawing Sheets

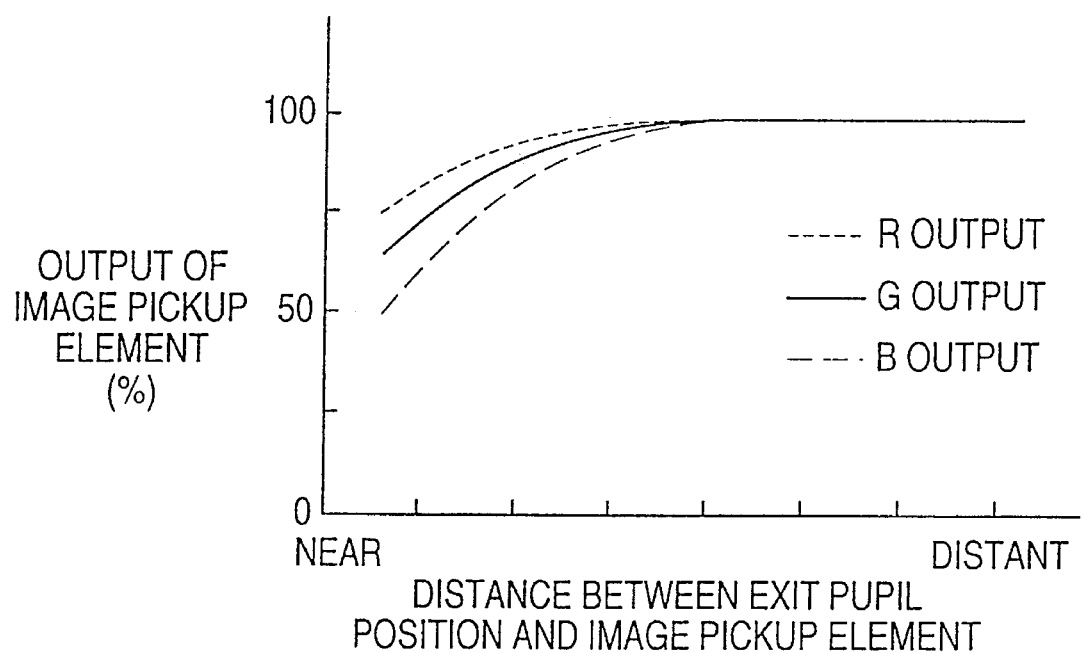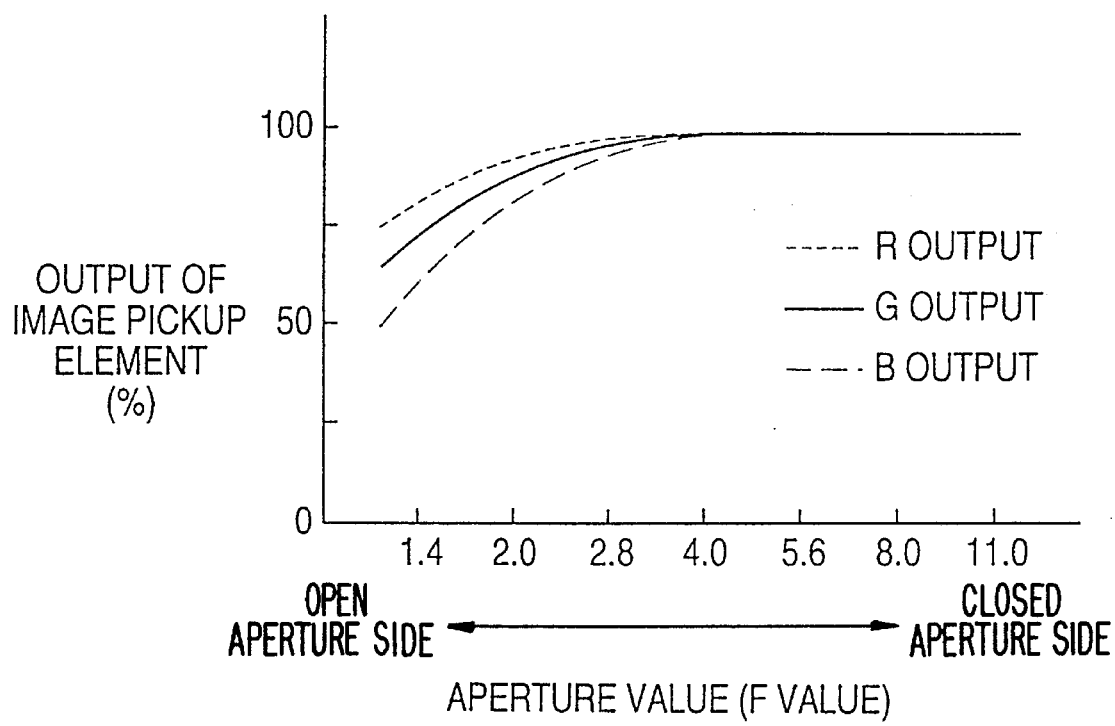

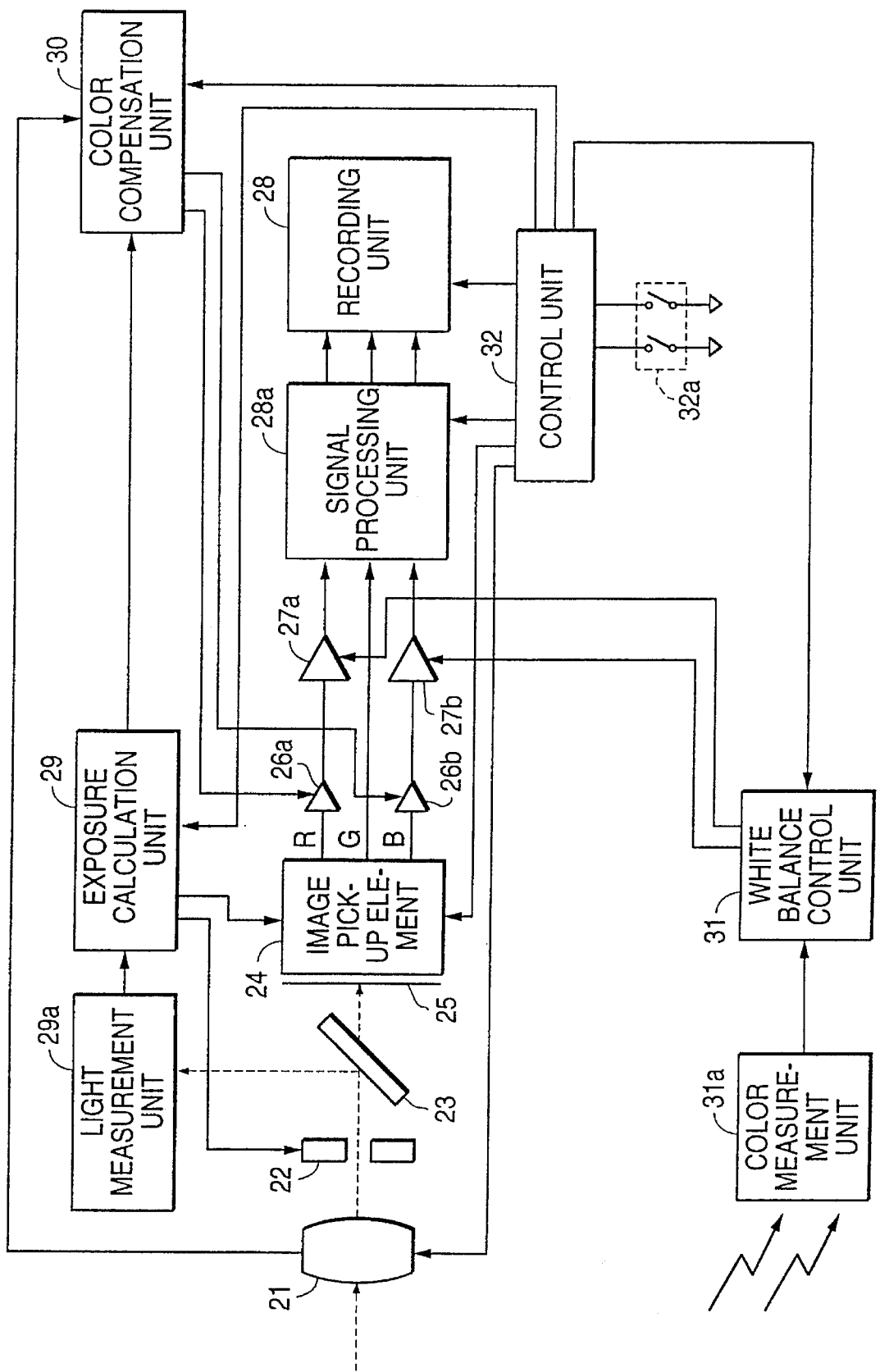

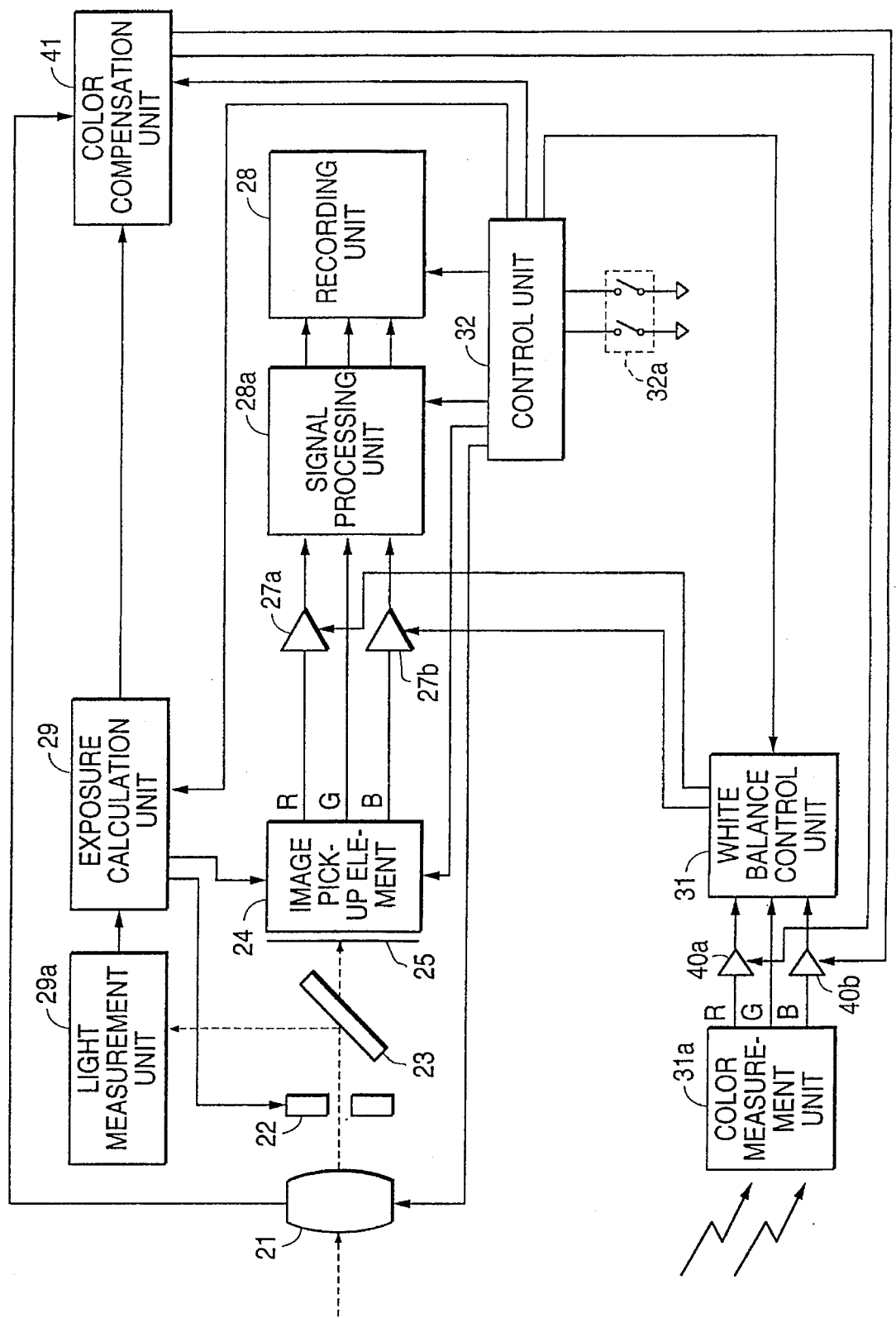

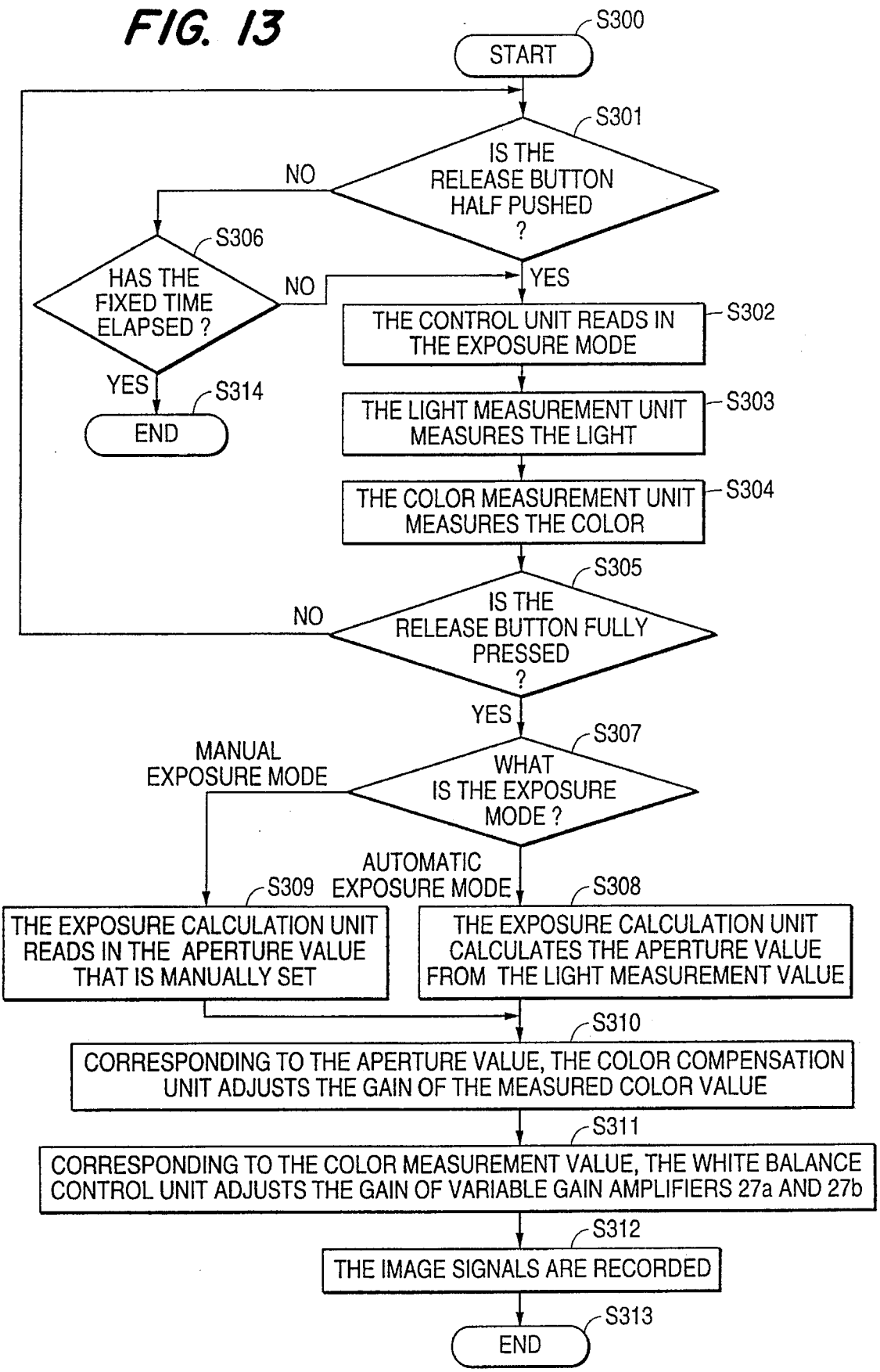

IMAGING DEVICE WHICH ADJUSTS THE RATIO OF COLOR EXCITATION VALUES PRODUCED BY AN IMAGE PICKUP ELEMENT IN ACCORDANCE WITH AN EXIT PUPIL POSITION AND THE SIZE OF AN APERTURE

BACKGROUND OF THE INVENTION

1. Field of the Invention

The present invention relates to an imaging device which uses a solid state image pickup element. More particularly, the present invention relates to an imaging device which (a) adjusts the ratio of color excitation values (for example, red/green/blue "RGB") of the image pickup element in correspondence with the exit pupil position of an associated optical unit, and (b) adjusts the ratio of the color excitation values in correspondence with the size of an aperture controlling light passing through the associated optical unit.

2. Description of the Related Art

A conventional imaging device converts optical images to image signals using a solid state image element, such as a CCD element (charge coupled device) or a MOS element (metal oxide semiconductor element). Moreover, recent technological developments have attempted to produce such an imaging device with a more compact solid state image element and to increase the number of pixels in the imaging device. Unfortunately, as an imaging device is made with a more compact solid state image element, the aperture efficiency of the image pickup element is reduced and the signal-to-noise (S/N) ratio of the image signals is decreased.

FIG. 1 is a diagram illustrating a cross section of a conventional CCD image pickup element. Referring now to FIG. 1, an image pickup element 1 includes a light receiving unit 1a (such as a "pixel") which converts light to an electric charge, and a transfer unit 1b which transfers the electric charge from light receiving unit 1a. Light receiving part 1a and transfer unit 1b are formed on the surface of image pickup element 1. An on-chip micro-lens 2 forms a condenser lens which corresponds to light receiving units 1a. On-chip micro-lens 2 is arranged on the surface of image pickup element 1.

With image pickup element 1, the light incident on-chip micro-lens 2 is focused on light receiving unit 1a. For example, as illustrated in FIG. 1, a light ray A and a light ray B are both focused by on-chip micro-lens 2 so that the respective light rays strike light receiving unit 1a. Therefore, the amount of light received by light receiving unit 1a is increased. Consequently, the level of the signals that are optoelectrically converted by light receiving unit 1a becomes larger, and the imaging device can output image signals with a high S/N ratio.

FIG. 2 is a diagram illustrating a conventional electronic still camera using a conventional CCD image pickup element. Referring now to FIG. 2, an aperture 4 and a mirror 5 are arranged in the optical axis of a photographic lens 3, and image pickup element 1 is arranged on the focal plane of photographic lens 3. On-chip micro-lens 2 is formed on the light receiving surface of image pickup element 1. Image pickup element 1 produces three excitation values (referred to as an "R output", a "G output" and a "B" output). A signal processing unit 7a processes the R output, G output and B output of image pickup element 1, and produces corresponding image signals. The G output of image pickup element 1 is connected "as is" (that is, "directly") to signal processing unit 7a. The R output and the B output of image pickup element 1 are connected to signal processing unit 7a through variable gain amplifiers 6a and 6b, respectively. A recording unit 7 records the image signals produced by signal processing unit 7a.

A light measurement unit 8a measures the subject brightness (that is, the brightness of a subject (not illustrated)) and is arranged in a position which is illuminated by the light reflected from mirror 5. An exposure calculation unit 8 is connected to light measurement unit 8a. Also, control terminals (not illustrated) of aperture 4 and image pickup element 1 are individually connected to output terminals of exposure calculation unit 8. A color measurement unit 9a measures the color of the ambient light. A white balance control unit 9 is connected to the control terminals of variable gain amplifiers 6a and 6b, and to color measurement unit 9a. In addition, a control unit 10 controls, and is connected to, photographic lens 3, image pickup element 1, signal processing unit 7a, recording unit 7, exposure calculation unit 8, and white balance control unit 9. A release button 10a is also connected to control unit 10. Release button has a half-push position and a full-push position and is pushed by a photographer to either the half-push position or the full-push position to initiate specific camera operations.

In an electronic still camera as illustrated in FIG. 2, when release button 10a is pushed to the half-push position, exposure calculation unit 8 incorporates the light measurement value of the subject brightness based on a measurement by light measurement unit 8a, and calculates the correct aperture value and exposure. Moreover, white balance control unit 9 incorporates the color measurement value of the ambient light based on a measurement by color measurement unit 9a, and controls the gain of variable gain amplifiers 6a and 6b in correspondence with the ratio of the three excitation values (RGB) of the ambient light. In this state, if release button 10a is pushed to the full-push position, mirror 5 flies up, and exposure calculation unit 8 adjusts aperture 4 to the correct aperture value.

The amount of light incident on image pickup element 1 from photographic lens 3 is restricted by aperture 4, and an optical image is focused on the light receiving plane of image pickup element 1. On-chip micro-lens 2 allows image pickup element 1 to raise the light receiving efficiency, and to produce image signals with a high S/N ratio. The white balance of the image signal produced by image pickup lens 1 is adjusted by variable gain amplifiers 6a and 6b. Signal processing unit 7a processes the image signal produced by image pickup lens 1 and adjusted by variable gain amplifiers 6a and 6b. Such processing performed by signal processing unit 7a can include, for example, gamma correction, and gain adjustment. The processed image signal produced by signal processing unit 7a is recorded in record unit 7.

As the exit pupil position of photographic lens 3 approaches image pickup element 1, the optical rays incident on on-chip micro-lens 2 from the side direction become more numerous. Because the light rays incident from the side direction are strongly affected by color aberrations on the axis of on-chip micro-lens 2, the size of spots focused on light receiving unit 1a change for every wavelength of light. For this reason, the amount of light output from light receiving unit 1a varies for every wavelength of light. This variation in the amount of light output from light receiving unit 1a causes the color phase of the light output from light receiving unit 1a to vary.

FIG. 3(A) is a graph indicating the output of an image pickup element versus the distance between the exit pupil position of an associated optical system and the image pickup element. As illustrated by FIG. 3(A), the ratio of the R output of an image pickup element to the G output of the image pickup element becomes large as the exit pupil position approaches (becomes "near") the image pickup element. As a result, an image produced by the image pickup element appears reddish as the exit pupil position approaches the image pickup element. Moreover, the ratio of B output of the image pickup element to the G output of the image pickup element becomes smaller as the exit pupil position approaches the image pickup element. As a result, the blueness of an image produced by the image pickup element becomes thin as the exit pupil position approaches the image pickup element.

In particular, if a zoom lens is used with an image pickup element, the exit pupil position is moved greatly forward and backward following the adjustment of the image angle. Therefore, there is a wide range of fluctuations in the ratio of RGB output from the image pickup element, and the color phase of the image varies greatly. This kind of color phase variation cannot be corrected by an external light white balance adjustment. Therefore, in a conventional imaging device, the color phase of an image produced by an image pickup element undesireably varies in correspondence with the exit pupil position of an associated photographic lens.

Moreover, referring to the imaging device illustrated in FIG. 2, if aperture 4 is set to the open aperture side (that is, near the fully open position), the light rays incident from the side in relation to on-chip micro-lens 2 become numerous. Therefore, there are changes in the color phase of the image produced by the image pickup element.

FIG. 3(B) is a graph indicating the output of an image pickup element versus the aperture value of an aperture controlling the light incident on the image pickup element. As illustrated by FIG. 3(B), the ratio of R output of an image pickup element to the G output of the image pickup element becomes large as the aperture approaches the open aperture side. As a result, the image produced by the image pickup element appears reddish as the aperture approaches the open aperture side. Moreover, the ratio of B output of the image pickup element to the G output of the image pickup element becomes small as the aperture approaches the open aperture side. As a result, the blueness of the image produced by the image pickup element becomes thin as the aperture approaches the open aperture side, Moreover, if the white balance is manually selected by the photographer, the white balance is often set to the lowest permissible limit. Therefore, the ratio of RGB output in the state of the open aperture changes, and there is an increased probability that the white balance will become unnatural.

In view of the above, it is difficult to accurately reproduce the color phases of the subject because the ratio of RGB output of an image pickup element changes depending on the aperture value.

SUMMARY OF THE INVENTION

Accordingly, it is an object of the present invention to provide an imaging device which produces image signals with a correct color phase, even if the exit pupil position of an associated optical system varies.

It is an additional object of the present invention to provide an imaging device which produces image signals with a correct color phase, even if the aperture value of an aperture which passes light to the imaging device changes.

Objects of the present invention are achieved by providing an imaging device, which includes an optical unit passing light from a subject and having an exit pupil position. An image pickup element receives the light from the subject passing through the optical unit, and produces an image signal from the received light. The image signal has corresponding color excitation values. A color compensation mechanism adjusts a ratio of the color excitation values of the image signal produced by the image pickup element by adjusting at least one of the color excitation values in correspondence with the exit pupil position of the optical unit.

Objects of the present invention are achieved by providing the imaging device with an aperture (such as the opening in a diaphragm) positioned between the optical unit and the image pickup element to limit the amount of light received by the image pickup element from the optical unit. The size of the aperture is adjustable. A color compensation mechanism adjusts a ratio of the color excitation values of the image signal produced by the image pickup element by adjusting at least one of the color excitation values in correspondence with the size of the aperture.

Moreover, objects of the present invention are achieved by providing the imaging device with a color measurement unit which measures ambient light and produces a corresponding signal having color excitation values. A color compensation mechanism adjusts a ratio of the color excitation values of the signal produced by the color measurement unit by adjusting at least one of the color excitation values in correspondence with the size of the aperture. A white balance control mechanism receives the signal produced by the color measurement unit and adjusted by the color compensation mechanism, and adjusts the white balance of the image signal produced by the image pickup element in accordance with the received signal.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 3(A) is a graph indicating the output of an image pickup element versus the distance between the exit pupil position of an associated optical system and the image pickup element.

FIG. 3(B) is a graph indicating the output of an image pickup element versus the aperture value of an aperture controlling the light incident on the image pickup element.

FIG. 5 is a diagram illustrating a camera having an imaging device according to an embodiment of the present invention.

FIG. 8 is a diagram illustrating a camera having an imaging device according to an embodiment of the present invention.

FIG. 13 is a flow chart illustrating a processing sequence of the camera illustrated in FIG. 12, according to an embodiment of the present invention.

DESCRIPTION OF THE PREFERRED EMBODIMENTS

Figure 1:
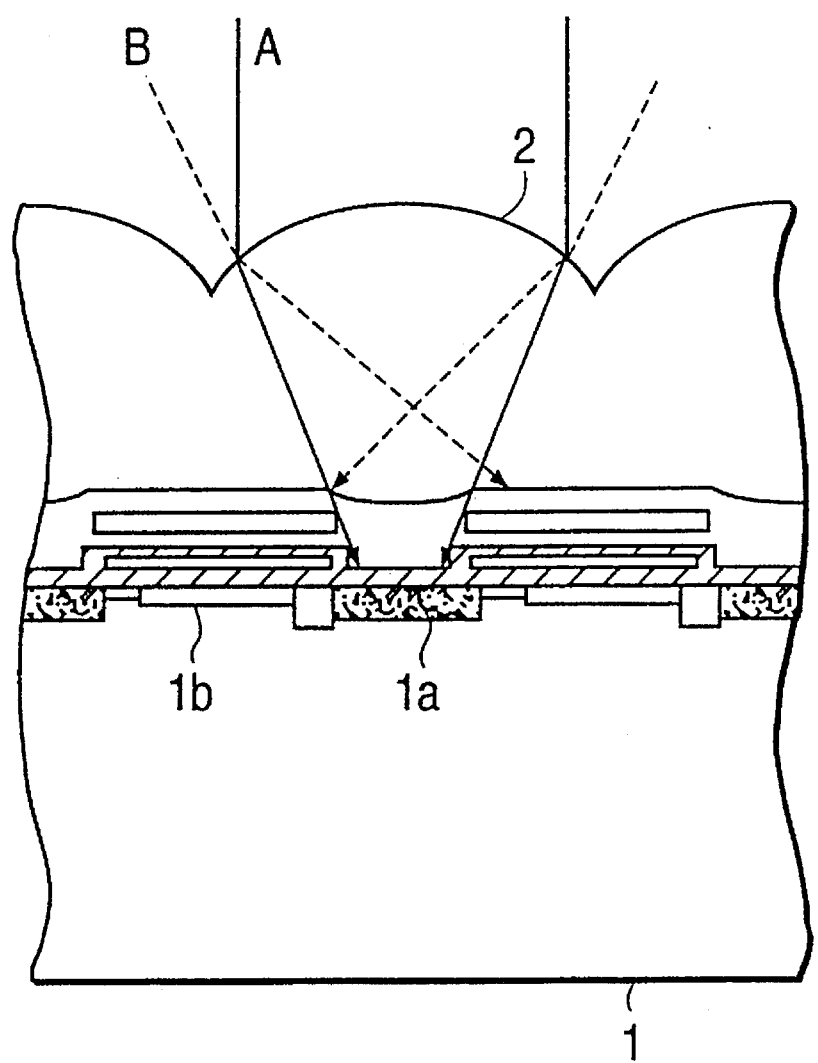
FIG. 1 (prior art) is a diagram illustrating a cross section of a conventional CCD image pickup element.
Figure 2:
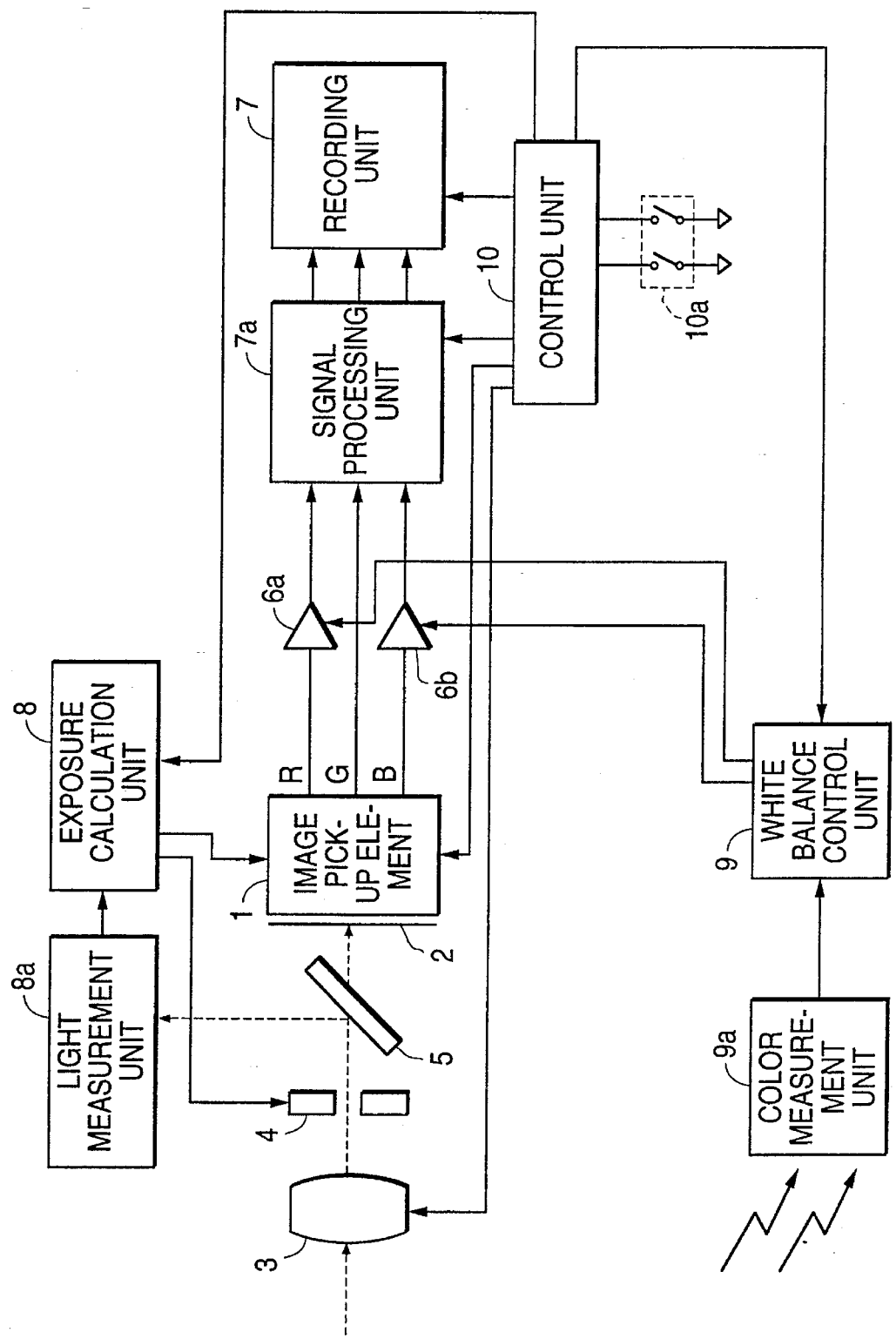
FIG. 2 (prior art) is a diagram illustrating a conventional electronic camera using a conventional CCD image pickup element.

Reference will not be made in detail to the present preferred embodiments of the present invention, examples of which are illustrated in the accompanying drawings, wherein like reference numerals refer to like elements throughout.

Figure 4:
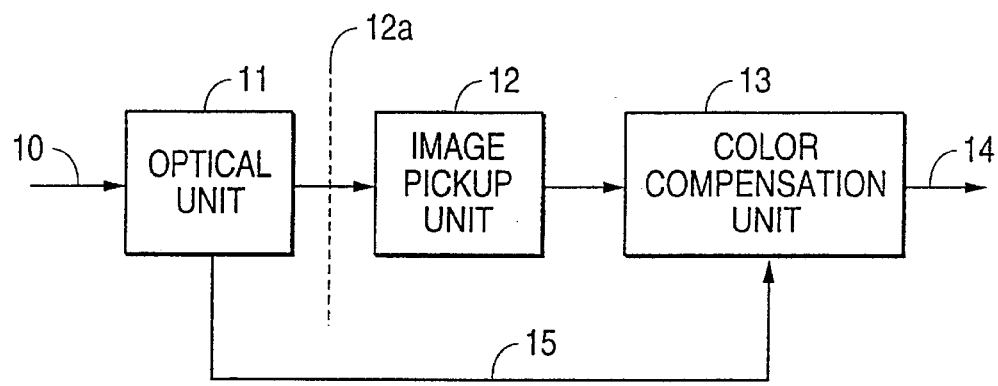
FIG. 4 is a diagram illustrating an imaging device according to an embodiment of the present invention.

FIG. 4 is a diagram illustrating an imaging device according to an embodiment of the present invention. Referring now to FIG. 4, the imaging device includes an optical unit 11 to focus an optical image onto an image pickup unit 12 from light rays 10 of a subject (not illustrated). An image pickup unit 12 photoelectrically converts the optical image focused by optical unit 11 into image signals 14. An on-chip micro-lens 12a forms a respective condenser lens for each light receiving pixel of image pickup unit 12, and light rays 10 pass through on-chip micro-lens 12a. For reasons such as the color aberration on the axis of on-chip micro-lens 12a, the ratio of the color excitation values of image signals 14 changes in correspondence with the exit pupil position of optical unit 11.

However, via line 15, a color compensation unit 13 receives the exit pupil position of optical unit 11 and, in correspondence with the exit pupil position, corrects the ratio of the image signal color excitation values converted by image pickup unit 12. Color compensation unit 13 corrects the ratio of the image signal color excitation values depending on a previously determined and stored amount of correction corresponding to the exit pupil position of optical unit 11.

More specifically, as the distance between the exit pupil position of optical unit 11 and image pickup unit 12 is reduced, color compensation unit 13 reduces the excitation value equivalent to the color red. Moreover, as the distance between the exit pupil position of optical unit 11 and image pickup unit 12 is reduced, color compensation unit 13 increases the excitation value equivalent to the color blue. Consequently, fluctuations of the excitation values due to the exit pupil position are canceled out, and image signals with a correct color phase are produced.

FIG. 5 is a diagram illustrating a camera having an imaging device according to an embodiment of the present invention. Referring now to FIG. 5, an aperture 22 and a mirror 23 are arranged on the optical axis of a photographic lens 21. An image pickup element 24 is arranged at the focal plane of photographic lens 21. An on-chip micro-lens 25 is formed on the light receiving surface of image pickup element 24. Image pickup element has green (G), red (R) and blue (B) outputs. The G output of image pickup element 24 is directly connected to a signal processing unit 28a. The R output of image pickup element 24 is connected to signal processing unit 28a through variable gain amplifiers 26a and 27a. The B output of image pickup element 24 is connected to signal processing unit 28a through variable gain amplifiers 26b and 27b.

Signal processing unit 28a processes signals produced by image pickup element 24. A recording unit 28 is connected to signal processing unit 28a, and records image signals produced by image pickup element 24 and processed by signal processing unit 8a. A light measurement unit 29a measures the brightness of light from a photographic subject (not illustrated), and is arranged in a position that is illuminated by light passing through photographic lens 21 and reflected from mirror 23. An exposure calculation unit 29 is connected to the output terminal of light measurement unit 29a. Control terminals of image pickup element 24 and a color compensation unit 30 are individually connected to the output terminal of exposure calculation unit 29. The output terminal of color compensation unit 30 is connected to the control terminal of variable gain amplifiers 26a and 26b. A color measurement unit 31a measures color of ambient light, and is connected to a white balance control unit 31. White balance control unit 31 is connected to the control terminals of variable gain amplifiers 26a and 26b.

A control unit 32 is connected to a zoom mechanism (not illustrated) within photographic lens 21, and information from photographic lens 21 indicating the exit pupil position of photographic lens 21 is transmitted to color compensation unit 30 through a lens mount unit (not illustrated) within photographic lens 21. In addition, control unit 32 for controlling overall operation is connected to image pickup element 24, signal processing unit 28a, recording unit 28, exposure calculation unit 29, color compensation unit 30 and white balance control unit 31.

A release button 32a for initiating photography is also connected to control unit 32. Release button 32a has a half-push position and a full-push position. When a photographer pushes release button 32a to the half-push position, various preparation processes, such as range finding and photometry, are performed. An exposure operation is performed when the photographer pushes release button 32a to the full-push position.

Figure 6:
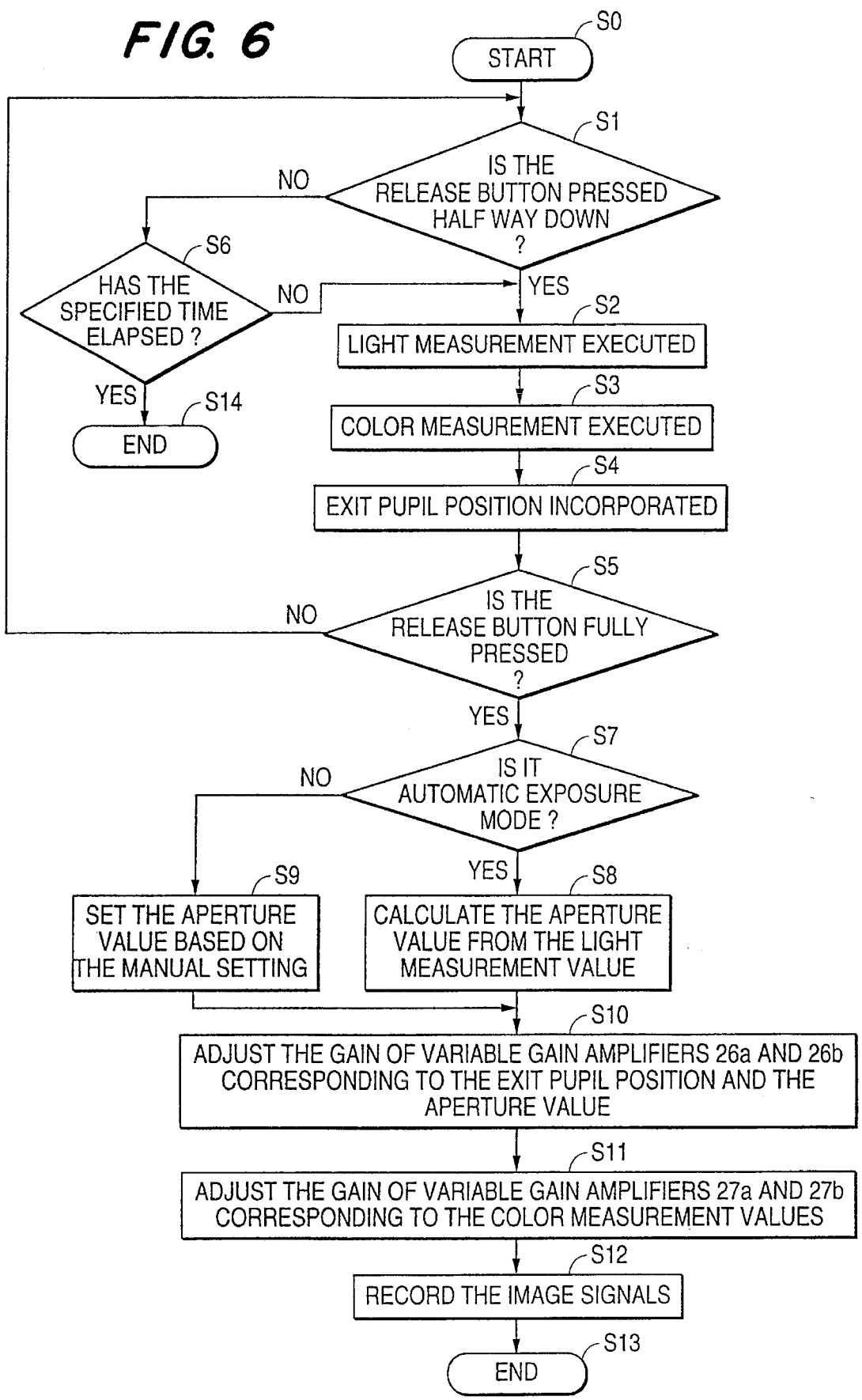
FIG. 6 is a flow chart illustrating a processing sequence of a camera having an imaging device, according to an embodiment of the present invention.

FIG. 6 is a flow chart illustrating a processing sequence of a camera having an imaging device as illustrated in FIG. 5, according to an embodiment of the present invention. Control unit 32 controls the processing sequence of the imaging device so that the processing sequence is as illustrated in FIG. 6. Referring now to FIG. 6, the process starts in step S0. From step S0, the process moves to step S1, where it is determined whether release button 32a is pushed to the half-push position. When release button 32a is pushed to the haft-push position in step S1, the process moves to step S2 where light measurement unit 29a measures the light reflected from mirror 23 and determines the subject brightness. From step S2, the process moves to step S3, where color measurement unit 31a measures the ratio of the three excitation values of the ambient light. From step S3, the process moves to step S4, where color compensation unit 30 incorporates information on the exit pupil position transmitted from photographic lens 21.

From step S4, the process moves to step S5, where it is determined whether or not release button 32a is in the full-push position. If release button 32a is not in the full-push position in step S5, the process returns to step S1. If release button 32a is not pushed to the half-push position in step S1, the process moves to step S6, where it is determined whether or not a specified time has elapsed since release button 32a was released if the specified time has not elapsed in step S6, the process moves to step S2. If the specified time has elapsed in step S6, the process moves to step S14 where the camera power source is stopped and camera operation ends. Therefore, if a fixed time elapses from the time that release button 32a is released, camera operations will end.

If release button 32a is pushed to the full-push position in step S5, the process moves to step S7, where control unit 32 determines the externally set exposure mode, if, in step S7, the exposure mode is "automatic exposure mode", the process moves to step S6, where exposure calculation unit 29 incorporates the light measurement value of the subject brightness determined in step S2, and calculates the appropriate aperture value and exposure time. If, in step S7, the exposure mode is "manual exposure mode", the process moves to step S9, where exposure calculation unit 29 reads an aperture value that is manually set by the photographer.

From steps S8 and S9, the process moves to step S10 where color compensation unit 30 incorporates the aperture value determined by exposure calculation unit 29. Here, in step S10, color compensation unit 30 derives the amount of correction by referring to a predetermined, prestored table (not illustrated) listing the amount of correction corresponding to the exit pupil position and aperture value, and the gain of variable gain amplifiers 26a and 26b is adjusted according to that amount of correction. Specifically, as the exit pupil position approaches image pickup element 24, the gain of variable gain amplifier 26a is lowered, and the gain of variable gain amplifier 26b is raised. Thus, the R output is lowered and the B output is increased. Moreover, in step S10, even if aperture 22 is set to the open aperture side, color compensation unit 30 lowers the gain of variable gain amplifier 26a, and raises the gain of variable gain amplifier 26b.

From step S10, the process moves to step S11, where white balance control unit 31 sets the gain of variable gain amplifiers 27a and 27b corresponding to the color measurement values of the ambient light. Therefore, after step S11 is completed, the color phase of the image signals output from image pickup element 24 is corrected based on the exit pupil position and the aperture value using variable gain amplifiers 26a and 26b, and the white balance is adjusted using variable gain amplifiers 27a and 27b to match the color temperature of the ambient light. From step S11, the process moves to step S12, where the image signals processed in steps S10 and S11 and passing through signal processing unit 28a are recorded in recording unit 28.

Therefore, as illustrated by FIG. 6, changes in the color phase are corrected based on the exit pupil position of a photographic lens and the aperture value of an aperture, and image signals with the correct color phase are produced, in particular, when a zoom lens is used, an imaging device according to embodiments of the present invention has, a significant effect in correcting the color phase since, with a zoom lens, the position of the exit pupil moves significantly forward and backward in correspondence with the amount of zoom.

Moreover, according to the above embodiments of the present invention, the R output is decreased as the distance between the image pupil position and image pickup element 24 is narrowed. Therefore, fluctuations in the color phase are effectively controlled by controlling the ratio of the R output to the G output, and the ratio of the R output to the B output.

Thus, the above embodiments of the present invention correct the phenomenon illustrated in FIG. 3(A), where the ratio of the B output decreases as the distance between the exit pupil position and the image pickup element is reduced.

In effect, according to the above embodiments of the present invention, the ratio of the R output to the G output, and the ratio of the R output to the B output is improved or corrected.

Furthermore, according to the above embodiments of the present invention, the B output is increased as the distance between the exit pupil position and image pickup element 12 is narrowed. Therefore, fluctuations in the color phase are effectively controlled by controlling the phenomenon illustrated in FIG. 3(A), where the ratio of B output decreases as the distance between the exit pupil position and the image pickup element is reduced. Moreover, by lowering the ratio of the R output (which increases on the open aperture side), fluctuations in the color phase caused by the aperture value can be effectively controlled. In addition, by raising the ratio of the blue output (which lowers on the open aperture side), fluctuations of the color phase on the open aperture side can be controlled.

As illustrated by FIGS. 5 and 6, color compensation unit 30 and variable gain amplifiers 26a and 27a together form a color compensation mechanism to adjust a ratio of color excitation values (the R output, G output and B output) of the image signal produced by image pickup element 24. Also, color measurement unit 31a, white balance control unit 31 and variable gain amplifiers 27a and 27b together form a white balance control mechanism to adjust the white balance of the image signal produced by image pickup element 24.

Figure 7:
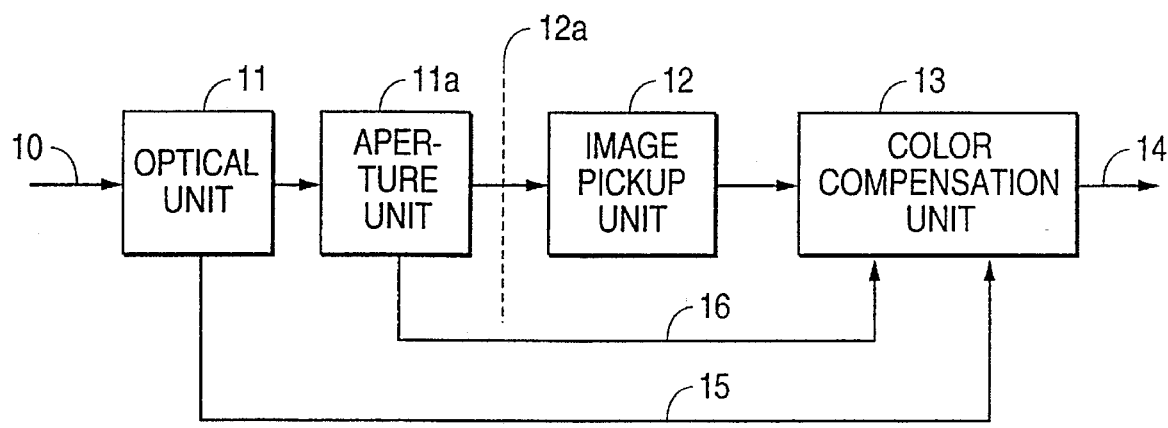
FIG. 7 is a diagram illustrating an imaging device according to an embodiment of the present invention.

FIG. 7 is a diagram illustrating an imaging device according to an additional embodiment of the present invention. Referring now to FIG. 7, the imaging device includes an aperture unit 11a which has an opening (not illustrated) passing light fluxes incident from optical unit 11. Aperture unit 11a adjusts the aperture value of the opening by changing the diaphragm of the opening. A color compensation unit 13 receives the exit pupil position of optical unit 11 via line 15, and receives the aperture diameter value of the opening in aperture unit 11a via line 16. Color compensation unit 13 corrects the ratio of the color excitation values converted by image pickup unit 12 in correspondence with the exit pupil position of optical unit 11 and the diameter of the opening of aperture unit 11a, and produces resulting image signals 14. More specifically, color compensation unit 13 reduces the excitation value equivalent to the color red, following an increase of the diameter of the opening of aperture unit 11a. Moreover, color compensation unit 13 increases the excitation value corresponding to the color blue, following the increase of the diameter of the opening of aperture unit 11a. A white balance adjustment unit (for example, see white balance control unit 31 in FIG. 8) can be used to adjust the white balance of image signals converted by image pickup unit 12. Color compensation unit 13 can then correct the amount of white balance adjustment based on the output produced by the white balance adjustment unit.

FIG. 8 is a diagram illustrating a camera having an imaging device according to an embodiment of the present invention. Referring now to FIG. 8, the G output of color measurement unit 31a is directly connected to white balance control unit 31, and the R output and B output are connected to white balance control unit 31 through variable gain amplifiers 40a and 40a, respectively. Color compensation unit 41 is connected to control terminals of variable gain amplifiers 40a and 40a. Information terminals of photographic lens 21, exposure calculation unit 29 and control unit 32 are connected to color compensation part 41.

Figure 9:
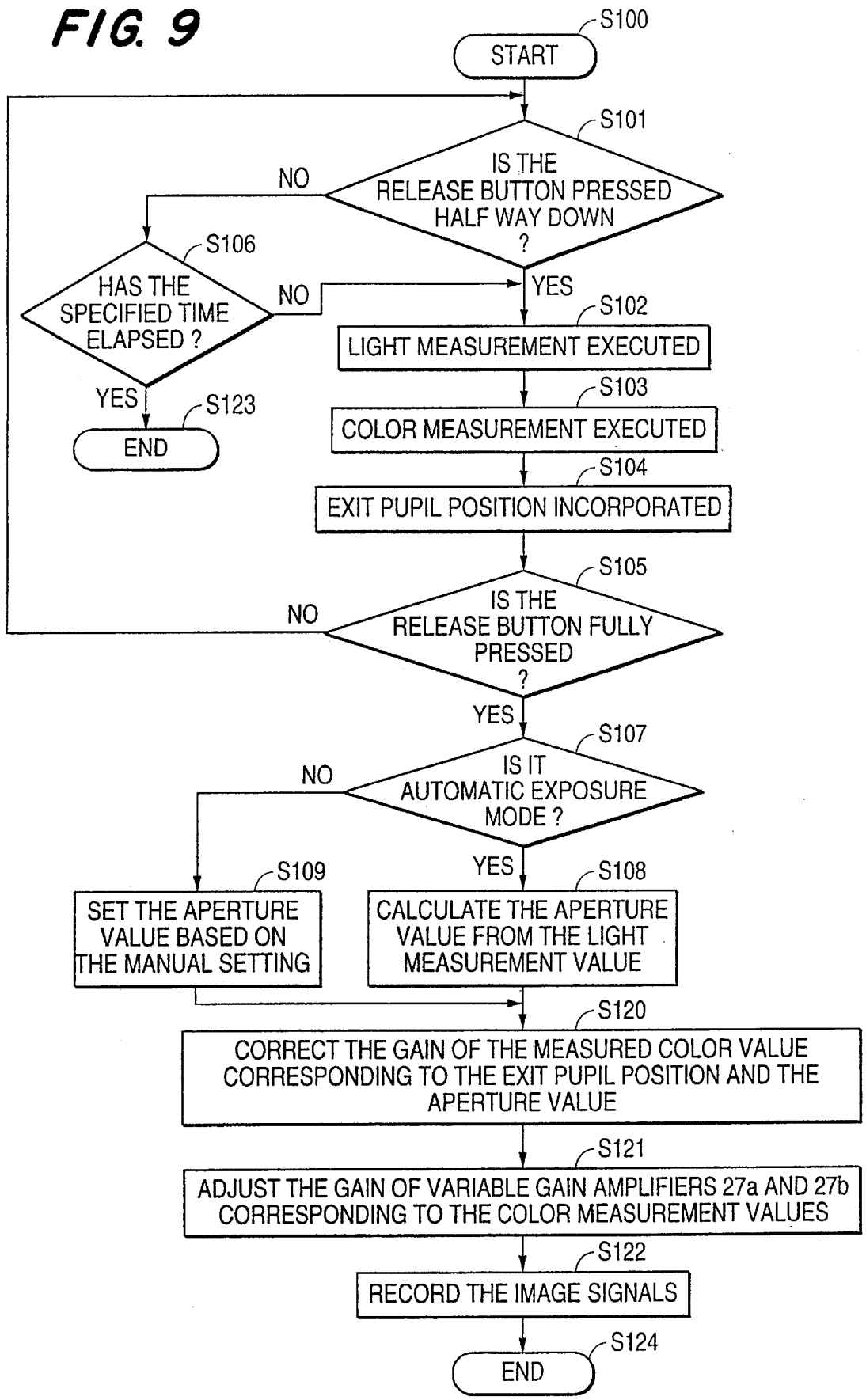
FIG. 9 is a flow chart illustrating a processing sequence of the camera illustrated in FIG. 8, according to an embodiment of the present invention.

FIG. 9 is a flow chart illustrating a processing sequence of the camera illustrated in FIG. 8, according to an embodiment of the present invention. Control unit 32 controls the processing sequence of the camera so that the processing sequence is as illustrated in FIG. 9. Referring now to FIG. 9, the process starts in step S100. From step S600, the process moves to step S101, where it is determined whether or not release button 32a is pushed to the half-push position. When release button 32a is pushed to the half-push position in step S101, the process moves to step S102, where light measurement unit 29a measures the light reflected from mirror 23 and determines the subject brightness. From step S102, the process moves to step S103, where color measurement unit 31a measures the ratio of the three excitation values of the ambient light and produces a color measurement value. From step S103, the process moves to step S104, where color compensation unit 30 incorporates information on the exit pupil position that is transmitted from photographic lens 21. From step S104, the process moves to step S105, where it is determined whether or not release button 32a is pushed to the full-push position, if release button 32a is not pushed to the pull-push position in step S105, the process returns to step S1.

If release button 32a is not pushed to the half-push position in step S101, the process moves to step S106 where it is determined whether a fixed time elapsed since release button 32a was released. If the fixed time has not elapsed in step S106, the process moves to step S102. If the fixed time has elapsed in step S106, the process moves to step S123 where the camera power source is stopped, and camera operation is concluded.

If release button 32a is pushed to the full-push position in step S105, the process moves to step S107, where control unit 32 determines the externally set exposure mode. If the exposure mode is set to "automatic exposure mode" in step S107, the process moves to step S108, where exposure calculation unit 29 incorporates the light measurement value of the subject brightness determined in step S102, and calculates the appropriate aperture value and exposure time. If the exposure mode is "manual exposure mode" in step S107, the process moves to step S109, where exposure calculation unit 29 reads an aperture value manually set by the photographer.

From steps S108 and S109, the process moves to step S120, where color compensation unit 30 incorporates the aperture value determined in step S108 or S109 from exposure calculation unit 29. Here, color compensation unit 30 corrects the measured color value that was measured by color measurement unit 31a in step S103. Specifically, as the exit pupil position approaches image pickup element 24, the gain of variable gain amplifier 40a is raised, and the gain of variable gain amplifier 40b is lowered. Moreover, even if aperture 22 is set to the open aperture side, color compensation unit 30 raises the gain of variable amplifier 40a, and lowers the gain of variable gain amplifier 4Ob.

From step S120, the process moves to step S21, where white balance control unit 31 sets the gain of variable gain amplifiers 27a and 27b corresponding to the measured color value of the ambient light corrected by the preceding steps. Consequently, for the image signals that are output from image pickup element 24, the white balance is adjusted by variable gain amplifiers 27a and 27b, and changes in the color phase caused by the exit pupil position and the aperture value are corrected. From step S121, the process moves to step S122, where the processed image signals are recorded in recording unit 28 through signal processing unit 28a.

In an imaging device according to embodiments of the present invention as illustrated in FIGS. 8 and 9, color compensation unit 41 corrects the amount of adjustment of white balance control unit 31, Therefore, it is not necessary to directly arrange a circuit (such as variable gain amplifiers 26a and 26b in the imaging device of the embodiment of the present invention illustrated in FIG. 5) in the signal route of the image signal. Consequently, because the circuit scale of the signal route is not increased, the beneficial effects of the present invention can be increased without reducing the S/N ratio and distortion ratio of the image signals.

Furthermore, in an imaging device according to embodiments of the present invention as illustrated in FIGS. 8 and 9, color compensation unit 41 corrects the color values measured by color measurement unit 31a; however, the invention is not intended to be limited in this manner, and the amount of correction by white balance control unit 31 may be corrected. For example, color compensation unit 41 may correct the control input of variable amplifiers 27a and 27b. With this type of configuration, even if the white balance is set manually, and color measurement unit 31a is not used, color compensation unit 41 can correct the gain of variable gain amplifiers 27a and 27b by matching the aperture value.

In an imaging device according to the above embodiments of the present invention, color compensation unit 30 and color compensation unit 41 derive the amount of correction corresponding to the exit pupil position and aperture value by referring to a table (not illustrated) in which the amount of correction has already been stored; however, the embodiments of the present invention are not intended to be limited to reference to a stored table. For example, the amount of correction corresponding to the exit pupil position and aperture may be calculated by stipulating in advance an equation to calculate the amount of correction, and this equation can then be used to calculate the amount of correction.

Figure 10:
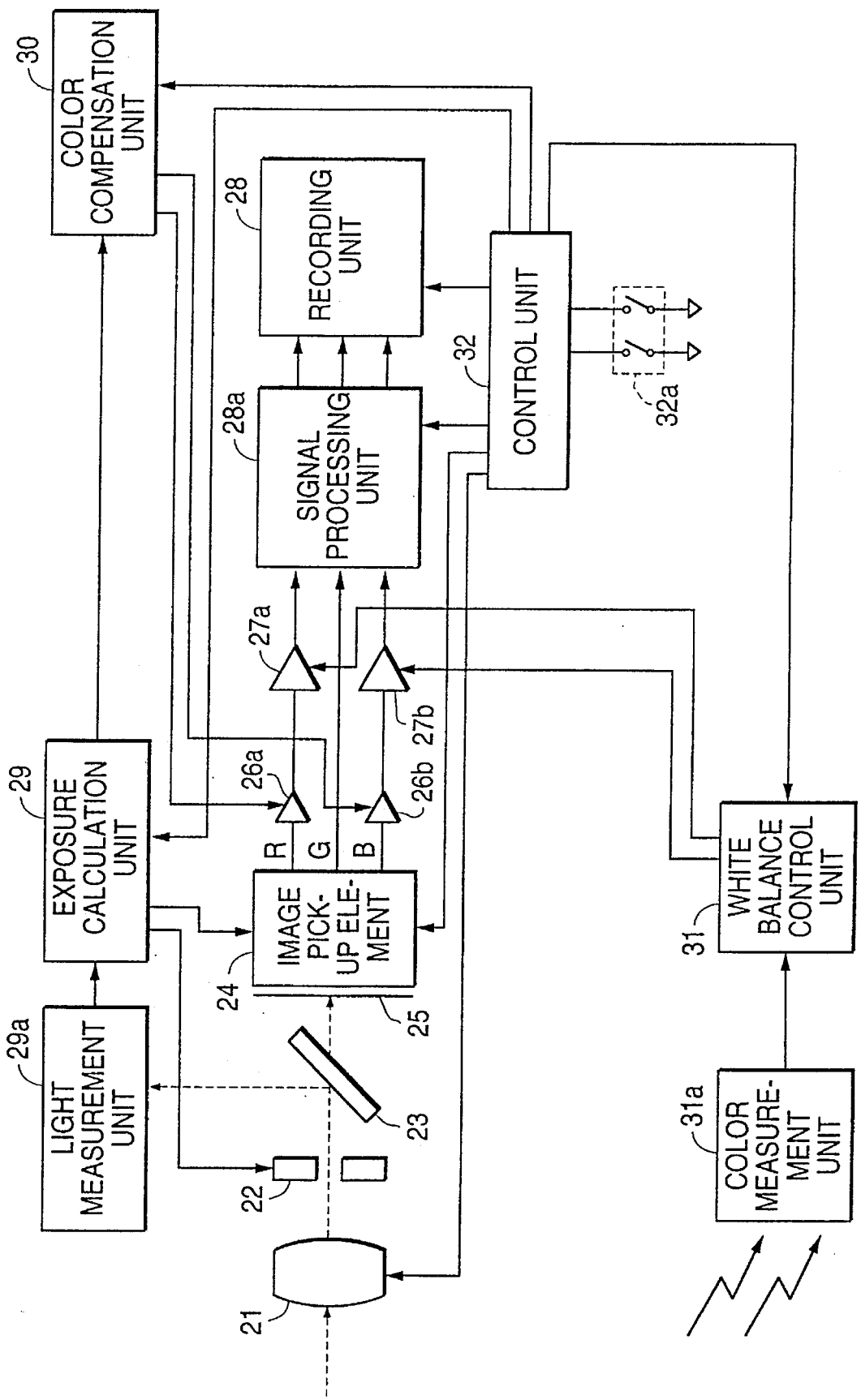
FIG. 10 is a diagram illustrating a camera having an imaging device, according to an embodiment of the present invention.

FIG. 10 is a diagram illustrating a camera having an imaging device, according to an additional embodiment of the present invention. Referring now to FIG. 10, aperture 22 and mirror 23 are arranged on the optical axis of photographic lens 21, and image pickup element 24 is arranged on the image forming plane of photographic lens 21. On-chip micro-lens 25 is formed on the light receiving surface of image pickup element 24.

The G output of image pickup element 24 is connected, as is, to signal processing unit 28a. The R output of image pickup element 24 is connected to signal processing unit 28a through variable gain amplifiers 26a and 27a. The B output of image pickup element 24 is connected to signal processing unit 28a through variable gain amplifiers 26b and 27b. Recording unit 28 records the image signals from signal processing unit 28a.

Light measurement unit 29a measures the brightness of a subject (not illustrated) and is arranged in a position that is illuminated by the light reflected from mirror 23. Exposure calculation unit 29 is connected to the output of light measurement unit 29a, and control terminals of image pickup element 24 and color compensation unit 30 are individually connected to an output terminal of exposure calculation unit 29. An output terminal of color compensation unit 30 is connected to the control terminals of variable gain amplifiers 26a and 26b. White balance control unit 31 is connected to the control terminals of variable gain amplifiers 26a and 26b. Color measurement unit 31a measures the color of the ambient light and is connected to white balance control unit 31. A control output from control unit 32 is provided to photographic lens 21, image pickup element 24, signal processing unit 28a, recording unit 28, exposure calculation unit 29, color compensation unit 30, and white balance control unit 31.

Figure 11:
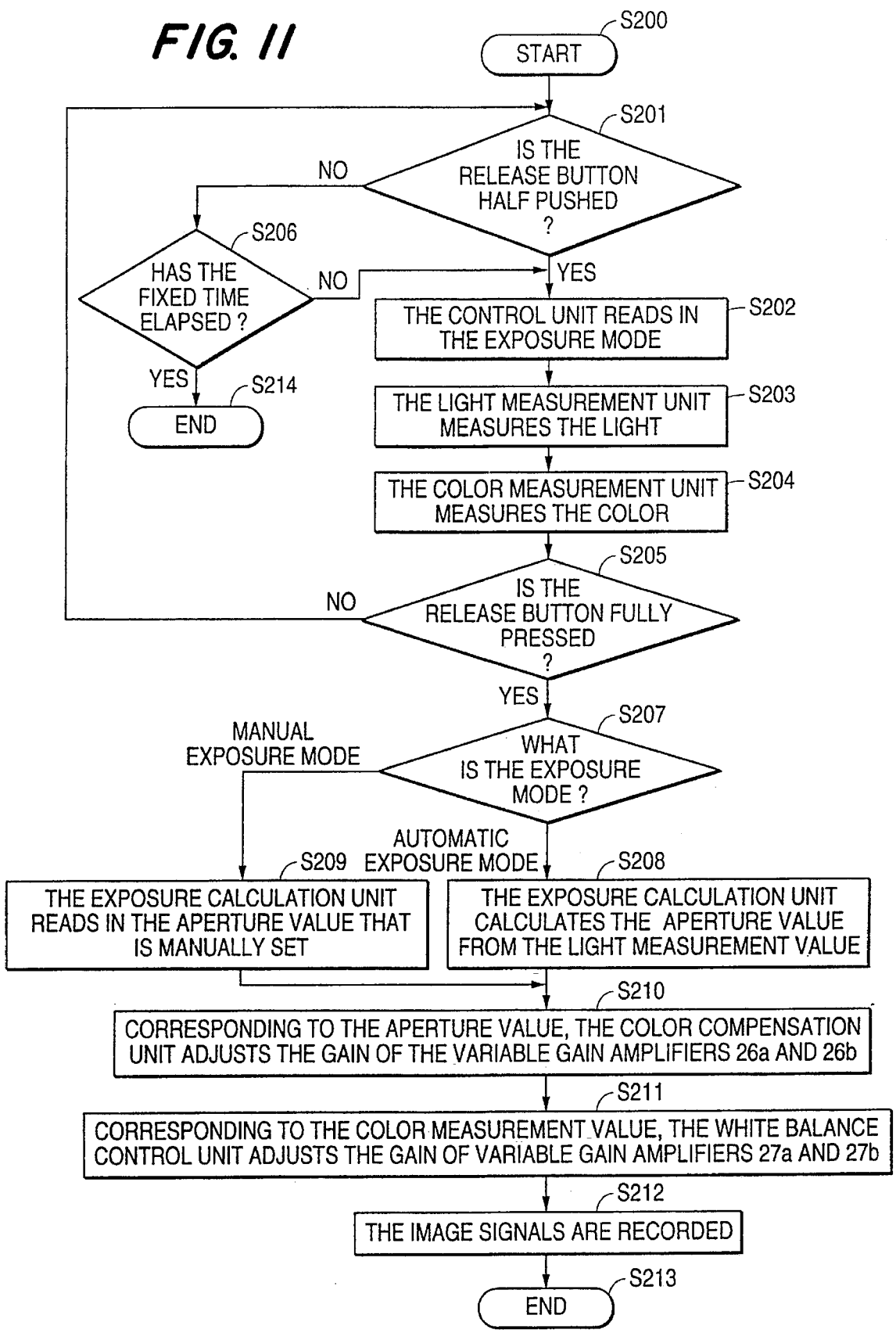
FIG. 11 is a flow chart illustrating a processing sequence of the camera illustrated in FIG. 10, according to an embodiment of the present invention.

FIG. 11 is a flow chart illustrating a processing sequence of the camera illustrated in FIG. 10, according to an embodiment of the present invention. Control unit 32 controls the processing sequence of the camera so that the processing sequence is as illustrated in FIG. 11. Referring now to FIG. 11, the process starts in step S200. From step S200, the process moves to step S201, where it is determined whether or not release button 32a is pushed to the half-push position. When release button is pushed to the half-push position in step S201, the process moves to step S202, where control unit 32 reads in the exposure mode that is set externally. From step S202, the process moves to step S203, where light measurement unit 29a determines the subject brightness by measuring the light reflected from mirror 23. From step S203, the process moves to step S204, where color measurement unit 31a measures and determines the ratio of the three excitation values of the ambient light. In this state, the process moves to step S205, where it is determined whether or not release button 32a is pushed to the full-push position, if release button 32a is not pushed to the full-push position in step S205, the process returns to step S201 and the above steps are repeated.

From step S201, the process moves to step S206 if release button 32a is not pushed to the full-push position. In step S206, it is determined if a fixed time elapsed since release button 32a was released. If the fixed time has not elapsed in step S206, the process moves to step S202. If the fixed time has elapsed in step S206, the process moves to step S214, where the camera power source is stopped and camera operation ends.

If release button 32a is pushed to the full-push position in step S205, the process moves to step S207, where control unit 32 determines the exposure mode. If the exposure mode is an "automatic exposure mode" in step S207, the process moves to step S208, where exposure calculation unit 29 incorporates the light measurement value of the subject brightness determined in step S203, and calculates the appropriate aperture value and exposure time. If the exposure mode is a "manual exposure mode" in step S207, the process moves to step S209, where exposure calculation unit 29 reads the aperture value that is manually set by the photographer.

From steps S208 and S209, the process moves to step S210, where color compensation unit 30 lowers the gain of variable gain amplifiers 26a and 26b on the open aperture side in correspondence with the aperture value determined in step S208 or S209. From step S210, the process moves to step S211, where white balance control unit 31 sets the gain of variable gain amplifiers 27a and 27b in correspondence with the color measurement values. In this state, the color phase of the image signals output from image pickup element 24 is corrected based on the aperture value using variable gain amplifiers 26a and 26b. Further, the white balance is adjusted using variable gain amplifiers 27a and 27b. From step S211, the process moves to step S212, where the processed image signals are recorded in recording unit 28 through signal processing unit 28a.

in an imaging device according to embodiments of the present invention as illustrated in FIGS. 10 and 11, changes in the color phase are corrected based on the aperture value, and image signals with the correct color phase are produced. Moreover, by lowering the gain of the R output (which is markedly increased on the open aperture side), fluctuations in the color phase caused by the aperture value can be effectively controlled.

Figure 12:
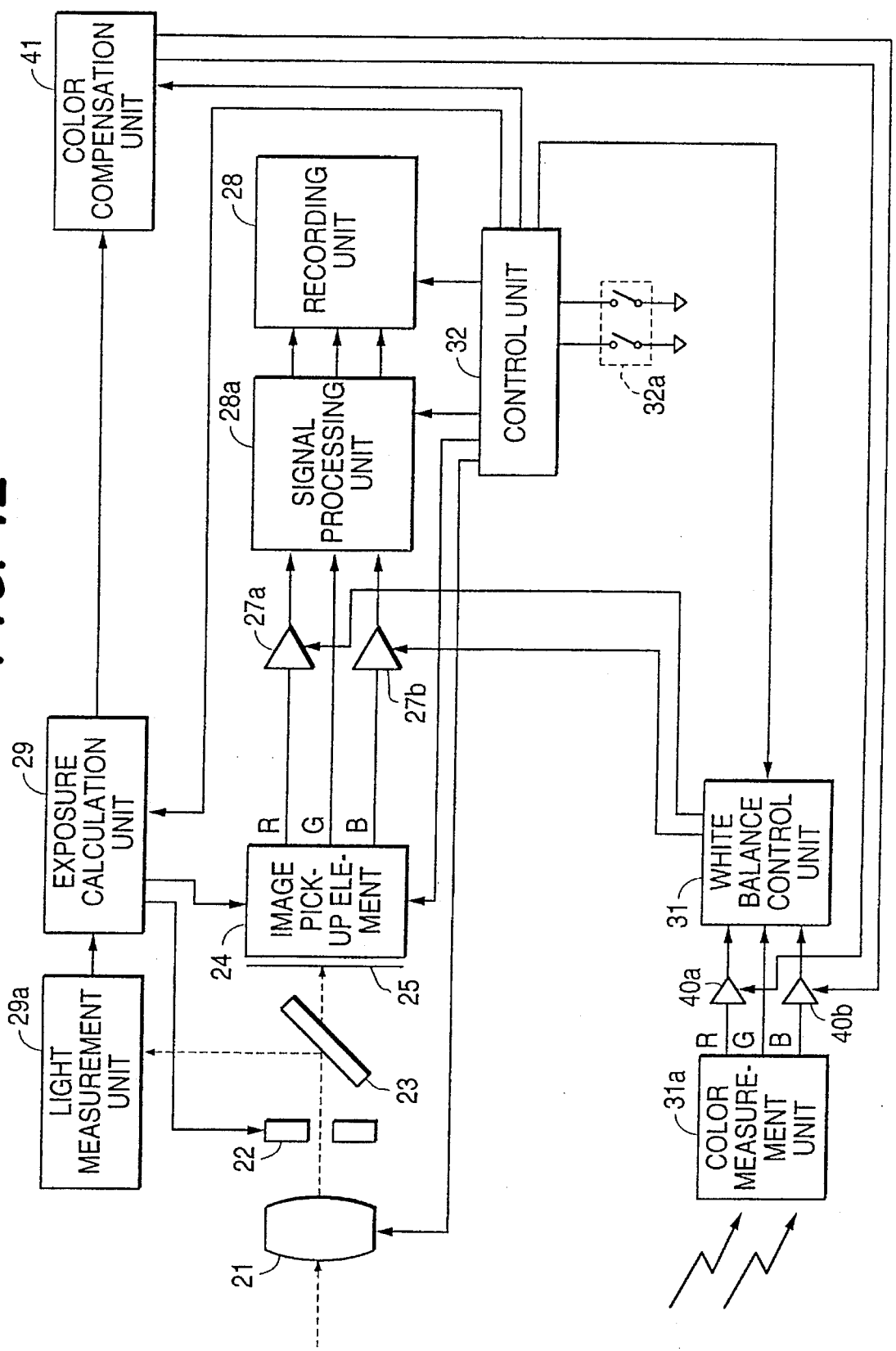
FIG. 12 is a diagram illustrating a camera having an imaging device, according to an embodiment of the present invention.

FIG. 12 is a diagram illustrating a camera having an imaging device, according to an embodiment of the present invention. Referring now to FIG. 12, the G output of color measurement unit 31a is connected, as is (that is, "directly") to white balance control unit 31, and the R output and B output are connected to white balance control unit 31 through variable gain amplifiers 40a and 40a, respectively. Color compensation unit 41 is connected to the control terminals of variable gain amplifiers 40a and 40a, and exposure calculation unit 29 and control unit 32 are connected to color compensation unit 41.

FIG. 13 is a flow chart illustrating a processing sequence of the camera having an imaging device, as illustrated in FIG. 12 and according to an embodiment of the present invention. Control unit 32 controls the processing sequence of the camera so that the processing sequence is as illustrated in FIG. 13. Referring now to FIG. 13, the process starts in step S300. From step S300, the process moves to step S301, where it is determined whether or not release button 32a is pushed to the half-push position. When release button 32a is pushed to the half-push position in step S301, the process moves to step S302, where control unit 32 reads the exposure mode that is externally set by the photographer.

From step S302, the process moves to step S303, where light measurement unit 29a measures the light reflected from mirror 23 and determines the subject brightness. From step S303, the process moves to step S304, where color measurement unit 31a measures the ratio of the three excitation values of the ambient light. From step S304, the process moves to step S305, where it is determined whether or not release button 32a is pushed to the full-push position. If release button 32a is not pushed to the full-push position in step S305, the process returns to step S301 and the above steps are repeated.

If release button 32a is not pushed to the half-push position in step S301, the process moves to step S306, where it is determined whether a fixed time elapsed after release button 32a was released. If the fixed time has not elapsed in step S306, the process moves to step S302. If the fixed time has elapsed in step S306, the process moves to step S314, where the power source of the camera is stopped and camera operations are terminated.

If release button 32a is pushed to the full-push position in step S305, the process moves to step S307, where control unit 32a determines the exposure mode of the camera. If the exposure mode is "automatic exposure mode" in step S307, the process moves to step S308, where exposure calculation unit 29 reads the light measurement value of the subject brightness measured in step S303, and calculates the appropriate aperture value and exposure time. If the exposure mode is "manual exposure mode" in step S307, the process moves to step S309, where exposure calculation unit 29 reads the aperture value that was manually set by the photographer.

From steps S308 and S309, the process moves to step S310, where color compensation unit 41 raises the gain of variable gain amplifiers 40a and 40b on the open aperture side corresponding to the aperture value determined in step S308 or step S309. Consequently, at white balance control unit 31, the ratios of the red color and blue color of the incorporated color measurement values become larger on the open aperture side. Therefore, from step S310, the process moves to step S311, where white balance control unit 31 drops the gain of variable gain amplifiers 27a and 27b on the open aperture side corresponding to the color measurement value. Consequently, the white balance of the image signals output from image pickup element 24 are adjusted by variable gain amplifiers 27a and 27b, and changes in the color phase due to the aperture value are corrected. From step S311, the process moves to step S312, where the processed image signals are recorded in recording unit 28 through signal processing unit 28a.

In an imaging device as illustrated in FIGS. 12 and 13, color compensation unit 41 corrects the amount of adjustment by white balance control unit 31. Therefore, it is not necessary to directly arrange variable gain amplifiers 26a and 26b in the signal route of the image signals. Consequently, the size of the circuit in the signal route is not increased, and it is possible to increase the beneficial effects of the present invention without reducing the S/N ratio or distortion ratio of the image signals.

In addition, in an imaging device as illustrated in FIGS. 12 and 13, color compensation unit 41 corrects the color measurement value from color measurement unit 31a; however, the above embodiment of the present invention is not intended to be limited to this configuration and the amount of adjustment of white balance control unit 31 may be corrected. For example, color compensation unit 41 may correct the control input of variable gain amplifiers 27a and 27b. Therefore, even if the white balance is manually set and color measurement unit 31a is not used, color compensation unit 41 can correct the gain of variable gain amplifiers 27a and 27b to match the aperture value.

According to the above embodiments of the present invention, if an interchangeable type photographic lens 21 which has an in-built aperture is used, the aperture value of the photographic lens side may be incorporated by exposure calculation unit 29 or color compensation units 30 and 41 on the camera body side.

In an imaging device according to embodiments of the present invention, the ratio of the color excitation values is corrected is correspondence with the aperture value. Therefore, fluctuations in the color phase caused by the aperture value can be controlled, and image signals with a correct color phase can be produced. Moreover, the excitation value equivalent to the color red, which markedly increases on the open aperture side, is reduced. Therefore, fluctuations in the color phase can be effectively controlled.

In an imaging device according to embodiments of the present invention, the excitation value equivalent to the color blue, which increases on the open aperture side, is increased. Therefore, fluctuations in the color phase caused by the aperture value can be controlled, and image signals with a correct color phase can be produced.

In an imaging device according to embodiments of the present invention, a color compensation unit corrects the ratio of the excitation values of the image signals through the white balance adjustment unit. Therefore, it is not necessary to have a separate arrangement of variable gain amplifiers in the signal route of the image signals. Consequently, fluctuations of the color phase caused by the aperture value can be controlled without reducing the S/N ratio and without distortion of the image signals. Thus, in a camera device which uses an imaging device according to the above embodiments of the present invention, the image quality can be improved without the aperture value changing the color phase of the image signals.

The color compensation unit incorporates the aperture value which is adjusted by the aperture unit, and the ratio of the color excitation values of the image signal which has been optoelectrically converted by the image pickup element is corrected by an amount of correction determined corresponding to this aperture value. Consequently, fluctuations of the excitation values caused by the aperture value can be canceled out, and image signals with a correct color phase are produced. Further, the excitation value equivalent to the color red of the image signal is reduced corresponding to the increase in the diameter of the opening unit of the aperture means.

in an imaging device according to the above embodiments of the present invention, the color compensation unit corrects the amount of adjustment of the white balance adjustment unit in correspondence with the aperture value. Because the ratio of the excitation values of the image signal is adjusted based on the amount of adjustment corrected in this manner, in addition to adjusting the white balance, fluctuations of the color phase caused by the aperture value are restricted.

In an imaging device according to the above embodiments of the present invention, the ratio of the color excitation values is corrected in correspondence with the exit pupil position, and fluctuations of the color phase caused by the exit pupil position are controlled. Thus, an image signal with a correct color phase is produced.

in an imaging device according to the above embodiments of the present invention, the ratio of the excitation value equivalent to the color red that increases markedly as the exit pupil position approaches the image pickup means is decreased. Therefore, the phenomenon of the image becoming reddish is prevented, and a satisfactory color phase balance can be maintained. Moreover, in an imaging device according to the above embodiments of the present invention, the ratio of the excitation value equivalent to the color blue that decreases markedly as the exit pupil position approaches the image pickup means is increased. Therefore, the phenomenon of the image blueness becoming thinner is prevented, and a satisfactory color phase balance can be maintained.

In an imaging device according to the above embodiments of the present invention, the color phase is corrected based on the exit pupil position in conjunction with correcting the color phase corresponding to the aperture value. Therefore, fluctuations of the color phase caused by the exit pupil position and the aperture value are controlled together, and image signals with a more correct color phase can be produced.

Moreover, in an imaging device according to the above embodiments of the present invention, an imaging device for the purpose of correcting the color phase corresponding to the exit pupil position and the aperture value are consolidated into a single imaging device. Therefore, the circuit scale can be more compact, and the costs can be lowered.

In an imaging device according to the above embodiments of the present invention, the ratio of the image signal excitation values are corrected through a white balance correction unit. Therefore, it is not necessary to directly arrange variable gain amplifiers into the signal route of the image signals. Consequently, it is possible to control fluctuations of the color phase caused by the aperture value without reducing the S/N ratio and distortions of the image signals.

In a camera having an imaging device according to the above embodiments of the present invention, it is possible to greatly improve image quality without changes of the color phase of image signals caused by the exit pupil position.

As indicated in FIG. 3(A), the ratio of the color red increases markedly as the exit pupil position approaches the image pickup element. Therefore, fluctuations of the color phase are effectively controlled by reducing the excitation value equivalent to the color red. Moreover, as indicated in FIG. 3(A), the ratio of blue color is markedly reduced as the exit pupil position approaches image pickup element. Therefore, fluctuations of the color phase are effectively controlled by increasing the excitation value equivalent to the color blue as the exit pupil position approaches the image pickup element.

In an imaging device according to the above embodiments of the present invention, the color phase is corrected based on the exit pupil position, and the color phase is corrected in correspondence with the aperture value. Specifically, a color compensation unit receives the aperture value, and corrects the ratio of color excitation values of the image signals that are optoelectrically converted by the image pickup element using the amount of correction previously stipulated and corresponding to this aperture value. Consequently, fluctuations of the excitation values caused by the exit pupil position and aperture value can be canceled, and an image signal with a correct color phase is produced.

In an imaging device according to the above embodiments of the present invention, the excitation value of the image signal equivalent to the color red is reduced in correspondence with the increase in the diameter of the opening of the aperture unit.

As indicated in FIG. 3(B), the ratio of the color red markedly increases on the open aperture side. Therefore, fluctuations of the color phase can be effectively controlled by reducing the excitation value equivalent to the color red as the aperture increases on the open aperture side. Moreover, in an imaging device according to the above embodiments of the present invention, the excitation value of the image signal equivalent to the color blue is increased in correspondence with the increase of the diameter of the opening of the aperture unit. As indicated in FIG. 3(B), the ratio of the color blue decreases on the open aperture side. Therefore, fluctuations of the color phase can be effectively controlled by increasing the excitation value equivalent to the color blue with the increase of the diameter of the opening of the aperture unit, In an imaging device according to the above embodiments of the present invention, a color compensation unit corrects the amount of adjustment of a white balance adjustment unit by the amount of correction previously stipulated corresponding to the exit pupil position and the aperture value. Because the ratio of the excitation values of the image signal is adjusted by the amount of adjustment that has been corrected, fluctuations of the color phase caused by the exit pupil position or the aperture value are corrected together with the adjustment of the white balance corresponding to the color temperature of the ambient light.

Moreover, in an imaging device according to the above embodiments of the present invention, a white balance adjustment unit adjusts the white balance of image signals from an image pickup element. A color compensation unit uses the white balance adjustment unit to correct the amount of white balance adjustment in correspondence with the aperture value of an aperture passing light to the image pickup element.

In an imaging device according to the above embodiments of the present invention, correction of the color phase was executed in correspondence with the exit pupil position and the aperture value; however, the embodiments of the present invention are not intended to be limited to correction of the color phase in this manner. For example, correction of the color phase may be executed in correspondence with only the exit pupil position.

In addition, in an imaging device according to the above embodiments of the present invention, the amount of correction corresponding to the combination of the exit pupil position and the aperture value was derived; however, the embodiments of the present invention are not intended to be limited in this manner. For example, the amount of correction corresponding to the exit pupil position and the amount of correction corresponding to the aperture value may be independently derived, and the color phase of the image signals may be individually corrected by these amounts of correction.

Moreover, in an imaging device according to the above embodiments of the present invention, the amount of correction corresponding to the value of the exit pupil position was calculated; however, the embodiments of the present invention are not intended to be limited to devices configured to directly incorporate the value of the exit pupil position, and the amount of correction may be calculated using an amount that correlates with the exit pupil position. For example, the amount of correction may also be calculated from the focal point distance of the photographic lens, the amount of lens extension, the amount of zoom or similar measurements.

In addition, in the above embodiments of the present invention the ratio of the RGB signals is corrected; however, the embodiments of the present invention are not intended to be limited to the image signals of the RGB color specification system or the ratio of image signals of other color specification systems. For example, XYZ color specification systems and YIQ color specification systems may also be corrected. Moreover, the ratio of the color excitation values may also be corrected by correcting signals which have a color phase standard. For example, the ratio of the color excitation values may also be corrected by shifting the phase of the burst unit of the video signal.

An image pickup element is described herein as being a CCD (charge coupled device) element or a MOS (metal oxide semiconductor) element. However, the embodiments of the present invention are not intended to be limited for use with CCD element or a MOS element and can be used with virtually any image pickup element which receives light and produces an image signal from the received light.

The above embodiments of the present invention are described as relating to an electronic still camera. However, the present invention is not intended to be limited to an electronic still camera, and may also be applied to camcorders, video cameras (without a recording device), video movie cameras, and other camera devices. Moreover, the present invention can be used with virtually any device which uses an imaging device.

The above embodiments of the present invention are described as relating to an aperture unit (for example, aperture unit 11a in FIG. 7) having an opening, wherein the aperture unit adjusts the aperture value of the opening by changing the diameter of the opening. However, the aperture unit can also be described as a diaphragm having an adjustable opening, wherein the diaphragm adjusts the size of the opening.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An imaging device, comprising:

an optical unit which passes light from a subject, the optical unit having an exit pupil position;

an image pickup element having a light receiving side and an on-chip micro-lens arranged on the light receiving side, the image pickup element receiving, on the light receiving side, the light from the subject passing through the optical unit, and producing an image signal from the received light, the image signal having corresponding color excitation values; and a color compensation mechanism adjusting a ratio of the color excitation values of the image signal produced by the image pickup element by adjusting at least one of the color excitation values in correspondence with the exit pupil position of the optical unit.

2. An imaging device as in claim 1, wherein the color excitation values include a color excitation value representing the color red, and the color compensation mechanism adjusts the color excitation value representing the color red in correspondence with the distance between image pickup element and the exit pupil position of the optical unit to reduce the color excitation value representing the color red as the distance between the image pickup element and the exit pupil position of the optical unit is reduced.

3. An imaging device as in claim 1, wherein the color excitation values include a color excitation value representing the color blue, and the color compensation mechanism adjusts the color excitation value representing the color blue in correspondence with the distance between image pickup element and the exit pupil position of the optical unit to increase the color excitation value representing the color blue as the distance between the image pickup element and the exit pupil position of the optical unit is reduced.

4. An imaging device as in claim 1, further comprising:

a diaphragm having an adjustable opening and which limits the amount of light received by the image pickup element from the optical unit in accordance with the size of the opening, wherein the color compensation mechanism adjusts a ratio of the color excitation values of the image signal produced by the image pickup element by adjusting at least one of the color excitation values in correspondence with the exit pupil position of the optical unit and the size of the opening in the diaphragm.

5. An imaging device as in claim 4, wherein the color excitation values include a color excitation value representing the color red, and the color compensation mechanism adjusts the color excitation value representing the color red in correspondence with the size of the opening in the diaphragm to reduce the color excitation value representing the color red as the size of the opening in the diaphragm is increased.

6. An imaging device as in claim 4, wherein the color excitation values include a color excitation value representing the color blue, and the color compensation mechanism adjusts the color excitation value representing the color blue in correspondence with the size of the opening in the diaphragm to increase the color excitation value representing the color blue as the size of the opening in the diaphragm is increased.

7. An imaging device as in claim 1, further comprising:

a white balance control mechanism adjusting the white balance of the image signal produced by the image pickup element.

8. An imaging device as in claim 4, further comprising:

a white balance control mechanism adjusting the white balance of the image signal produced by the image pickup element.

9. An imaging device comprising:

an optical unit which passes light frown a subject, the optical unit having an exit pupil position;

an image pickup element which receives the light from the subject passing through the optical unit and produces an image signal from the received light, the image signal having corresponding color excitation values; and a color compensation mechanism adjusting a ratio of the color excitation values of the image signal produced by the image pickup element by adjusting at least one of the color excitation values in correspondence with the exit pupil position of the optical unit.

10. An imaging device, comprising:

an optical unit which passes light from a subject;

an image pickup element receiving the light from the subject passing through the optical unit, and producing an image signal from the received light;

a diaphragm having an adjustable opening and which limits the amount of light received by the image pickup element from the optical unit in accordance with the size of the opening;

a color measurement unit measuring ambient light and producing a corresponding signal having color excitation values;

a color compensation mechanism adjusting a ratio of the color excitation values of the signal produced by the color measurement unit by adjusting at least one of the color excitation values in correspondence with the size of the opening in the diaphragm; and a white balance control mechanism receiving the signal produced by the color measurement unit and adjusted by the color compensation mechanism, and adjusting the white balance of the image signal produced by the image pickup element in accordance with the received signal.

11. An imaging device, comprising:

an optical unit which passes light from a subject;

an image pickup element having a light receiving side and an on-chip micro-lens arranged on the light receiving side, the image pickup element receiving, on the light receiving side, the light from the subject passing through the optical unit, and producing an image signal from the received light, the image signal having corresponding color excitation values;

a diaphragm having an adjustable opening and positioned between the optical unit and the image pickup element to limit the amount of light received by the image pickup element from the optical unit in accordance with the size of the opening in the diaphragm; and a color compensation mechanism adjusting a ratio of the color excitation values of the image signal produced by the image pickup element by adjusting at least one of the color excitation values in correspondence with the size of the opening in the diaphragm.

12. An imaging device as in claim 11, wherein the color excitation values include a color excitation value representing the color red, and the color compensation mechanism adjusts the color excitation value representing the color red in correspondence with the size of the opening in the diaphragm to reduce the color excitation value representing the color red as the size of the opening in the diaphragm increased.

13. An imaging device as in claim 11. Wherein the color excitation values include a color excitation value representing the color blue, and the color compensation mechanism adjusts the color excitation value representing the color blue in correspondence with the size of the opening in the diaphragm to increase the color excitation value representing the color blue as the size of the opening in the diaphragm is increased.

14. An imaging device as in claim 11, further comprising:
a white balance control mechanism adjusting the white balance of the image signal produced by the image pickup element.

15. A method of producing an image signal based on light from a subject, where an optical unit has an exit pupil position and an image pickup element has a light receiving side and an on-chip micro-lens arranged on the light receiving side, the method comprising:

passing light from the subject through the optical unit;

receiving the light passing through the optical unit on the light receiving side of the image pickup element, the image pickup element producing an image signal from the received light, the image signal having corresponding color excitation values; and adjusting the ratio of the color excitation values of the image signal in correspondence with the exit pupil position of the optical unit.

16. A method of producing an image signal based on light from a subject, where an optical unit passes light therethrough, an image pickup element has a light receiving side and an on-chip micro-lens arranged on the light receiving side to receive light passing through the optical unit, and a diaphragm having an adjustable opening which limits the amount of light received by the image pickup element from the optical unit in accordance with the size of the opening, the method comprising:

passing light from the subject through the optical unit;

receiving the light passing through the optical unit on the light receiving side of the image pickup element, the image pickup element producing an image signal from the received light, the image signal having corresponding color excitation values; and adjusting the ratio of the color excitation values of the image signal in correspondence with the size of the opening in the diaphragm.

* * * * *

UNITED STATES PATENT AND TRADEMARK OFFICE
CERTIFICATE OF CORRECTION

PATENT NO.  :   5,602,412
DATED       :   February 11, 1997
INVENTOR(S) :   Masahiro SUZUKI, et al.

It is certified that error appears in the above-indentified patent and that said Letters Patent is hereby corrected as shown below:

Column 18 (claim 9), line 2, "frown" should be  --from--.

Signed and Sealed this

Twenty-fourth Day of June, 1997

*Attest:*

BRUCE LEHMAN

*Attesting Officer*   Commissioner of Patents and Trademarks